United States Patent [19]

Umbaugh et al.

[11] 4,149,489

[45] Apr. 17, 1979

[54] VALVING SYSTEM FOR MILKING

[75] Inventors: Raymond E. Umbaugh, 4150 Baseline Rd., Boulder, Colo. 80303; Gene A. Fisher, Lafayette, Colo.

[73] Assignee: Raymond E. Umbaugh, Boulder, Colo.

[21] Appl. No.: 814,518

[22] Filed: Jul. 11, 1977

Related U.S. Application Data

[62] Division of Ser. No. 628,698, Nov. 4, 1975, Pat. No. 4,034,714.

[51] Int. Cl.² .............................................. A01J 7/00
[52] U.S. Cl. .................................................. 119/14.18
[58] Field of Search ............... 119/14.18, 14.08, 14.05, 119/14.46, 14.43; 137/239, 625.68; 134/96, 97, 98, 99

[56] References Cited

U.S. PATENT DOCUMENTS

| | | | |
|---|---|---|---|
| 2,713,344 | 7/1955 | Gallistel | 137/239 X |
| 2,779,308 | 1/1957 | Gallistel | 119/14.18 |
| 3,044,443 | 7/1962 | Baum | 119/14.18 X |

FOREIGN PATENT DOCUMENTS 1017567  1/1966  United Kingdom .................. 119/14.18

*Primary Examiner*—Hugh R. Chamblee
*Attorney, Agent, or Firm*—O'Rourke & Harris

[57] ABSTRACT

A valving system is disclosed that is useful for milking of animals such as cows. A stimulator, that includes one or more stimulator units each of which has biased elements, is releasably positioned on one or more teats of the animal to be milked and a warm liquid such as water is conducted through the stimulator units and ejected therefrom onto the associated teat or teats in order to induce milk let down. Each biased element has resilient gripping teeth to engage the teats of the animal to be stimulated. After the supply of liquid is terminated and the teat cups of a milking apparatus have been positioned on the animal, milk is withdrawn from the animal through a valve under the control of a control unit that has an input responsive to the temperature of the milk being withdrawn. When the temperature falls to a predetermined point indicating the end of milking of the animal and to automatically cause the valve to assume a rinse and/or drain position to rinse or sanitize the milking apparatus and allow the same to drain. The valve is multi-ported and three embodiments have been disclosed. In two embodiments, the rinse and drain positions are separate while in a third embodiment, the rinse and drain positions are combined.

13 Claims, 15 Drawing Figures

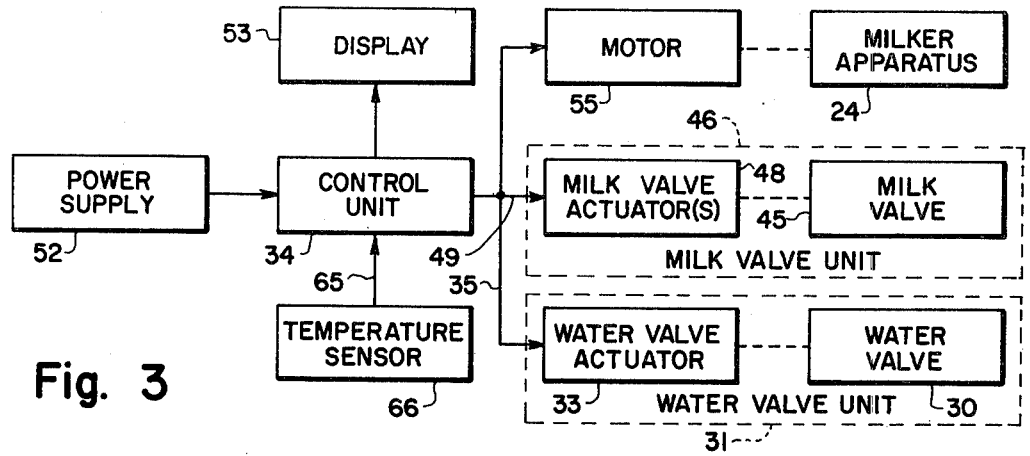
Fig. 3
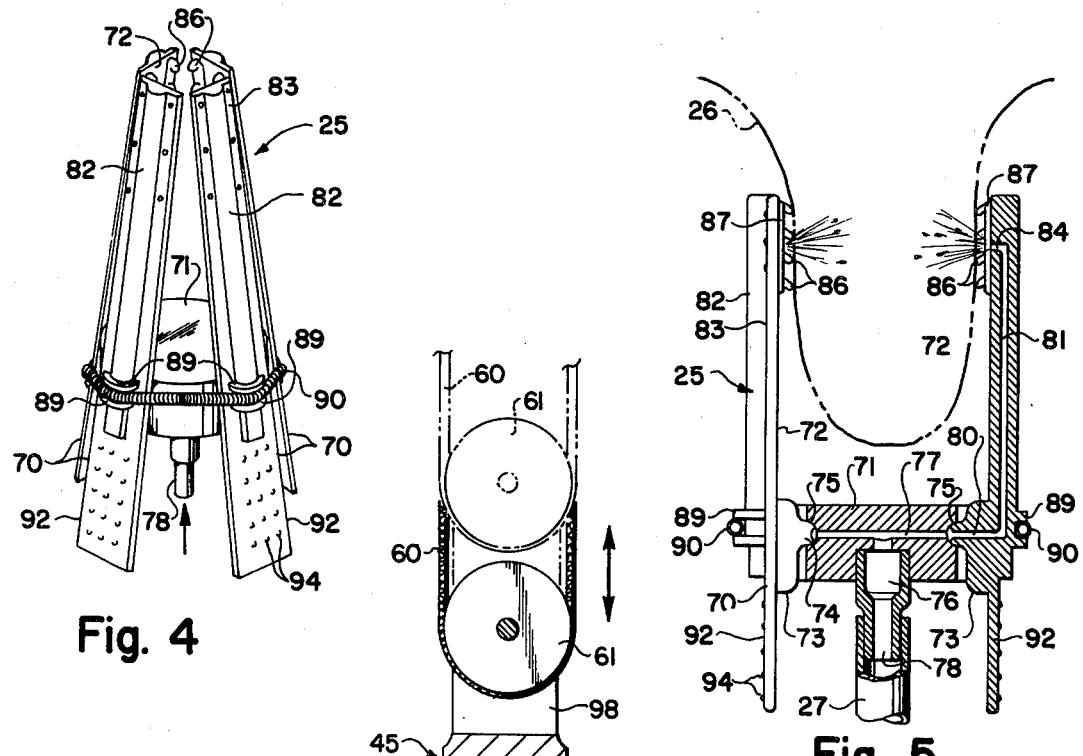
Fig. 4
Fig. 5
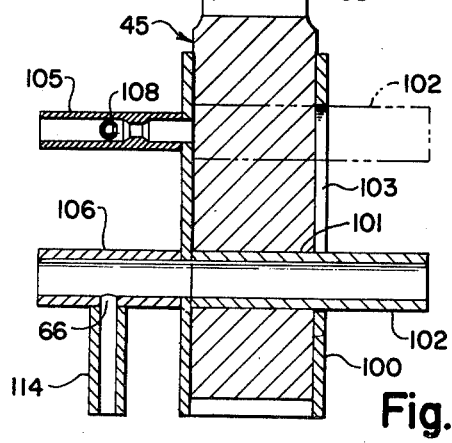
Fig. 7

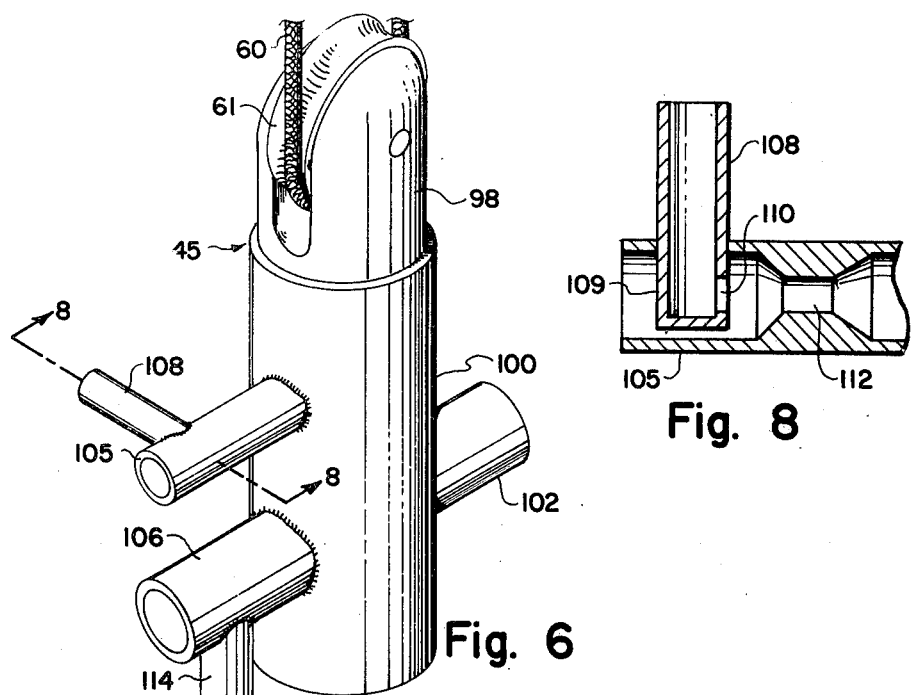
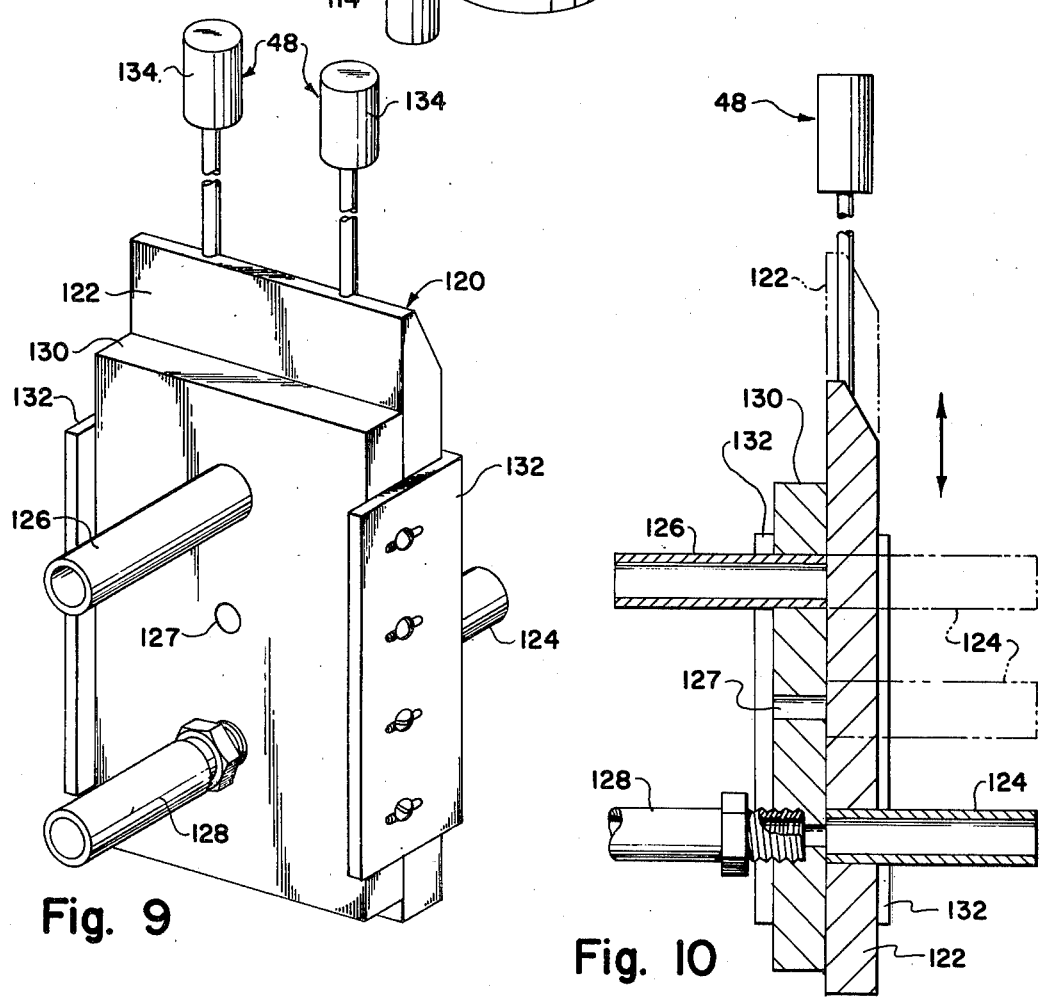

VALVING SYSTEM FOR MILKING

Related Application

This application is a division of our co-pending U.S. Pat. application Ser. No. 628,698 filed Nov. 4, 1975, now U.S. Pat. No. 4,034,714, and entitled "STIMULATING AND VALVING SYSTEM FOR MILKING".

Field of the Invention

This invention relates to a valving system and, more particularly, relates to a valve useful in milking of animals.

BACKGROUND OF THE INVENTION

Milking apparatus of the automatic type is well known, and such apparatus is shown for example, in U.S. Pat. Nos. 514,551; 2,608,951; 3,033,161; 3,079,891; 3,388,689; and 3,605,695. In addition, milker retraction apparatus for a milker has also been heretofore suggested and/or utilized, as shown, for example, by U.S. Pat. Nos. 2,641,223 and 3,738,321.

As is common with automatic milking devices, when the end of milking is determined, the apparatus must be removed from the animal and the apparatus then prepared for later milking use, with one such apparatus commonly being utilized to milk several different animals in a given time period.

Several devices have been developed for sensing the end of milking and one such device, as shown in U.S. Pat. No. 3,874,337, senses the temperature of the milk withdrawn from an animal being milked and, responsive thereto, controls withdrawal of the milking apparatus and/or indicates the presence of an abnormality, such as sensed fever.

The use of stimulation to induce milk let down in an animal to be milked has also heretofore been broadly suggested including the use of warm water, electric shock, and/or various gripping devices. For example, see U.S. Pat. Nos. 507,069; 948,440; 3,301,215; 3,366,111; and 3,406,663.

Valves have also heretofore been utilized in conjunction with cleaning of milking apparatus, and examples of such valves are shown in U.S. Pat. Nos. 1,579,796; 1,803,319; 1,837,484; 2,624,355; 2,714,893; 2,717,576; and 3,726,253. In addition, valves have heretofore been utilized having a plurality of ports (see, for example, U.S. Pat. No. 1,854,307) and sliding valves have also been utilized (see, for example, U.S. Pat. No. 2,253,341).

Stimulators and valves heretofore suggested and/or utilized have not, however, proved to be completely successful in accomplishing the desired ends, at least in some instances, and improvements therein for milking apparatus, was therefore desirable.

SUMMARY OF THE INVENTION

This invention provides an improved valving system for milking apparatus. The stimulator includes a plurality of biased elements to releasably grip the teats of an animal to be milked, with warm liquid being supplied through the elements to the associated teats to induce milk let down. The valve of this invention is multiported so that the milking apparatus can be automatically cleaned and/or sanitized and drained after each use.

It is therefore an object of this invention to provide an improved valve system.

It is another object of this invention to provide an improved valve system for milking apparatus.

It is still another object of this invention to provide an improved valve for milker apparatus.

It is still another object of this invention to provide an improved valve for milker apparatus for effecting automatic rinsing and/or sanitizing and draining of milker apparatus after use.

It is yet another object of this invention to provide an improved valve for milker apparatus to control milking and cleaning of such apparatus.

It is still another object of this invention to provide an improved valve for milker apparatus that includes structure to prevent warm liquids from being introduced into the milk line.

It is yet another object of this invention to provide an improved sliding valve for milker apparatus that insures draining of the system before connection to a milker line.

It is still another object of this invention to provide an improved rotary valve for milker apparatus that insures draining of the system before connection to a milk line.

It is yet another object of this invention to provide an improved valve for milker apparatus that enables a liquid rinse and/or sanitizing and drain of the milking apparatus at a single port.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWING

The accompanying drawings illustrate complete embodiments of the invention according to the best mode so far devised for the practical application of the principles thereof, and in which:

FIG. 3 is a block diagram illustrating operational control of the milking and stimulation units;

FIG. 4 is a perspective view of the stimulator gripping device;

FIG. 5 is a cutaway side view of the stimulation gripping device shown in FIG. 4;

FIG. 6 is a perspective view of the preferred embodiment of milking valve;

FIG. 7 is a cutaway side view of the milking devise shown in FIG. 6;

FIG. 8 is a partial section illustrating the combined liquid and drain port of the milk valve shown in FIGS. 6 and 7;

FIG. 9 is a perspective view of a sliding valve that is an alternate embodiment of milking valve;

FIG. 10 is a cutaway side view of the sliding valve shown in FIG. 9;

DESCRIPTION OF THE INVENTION

Figure 1:
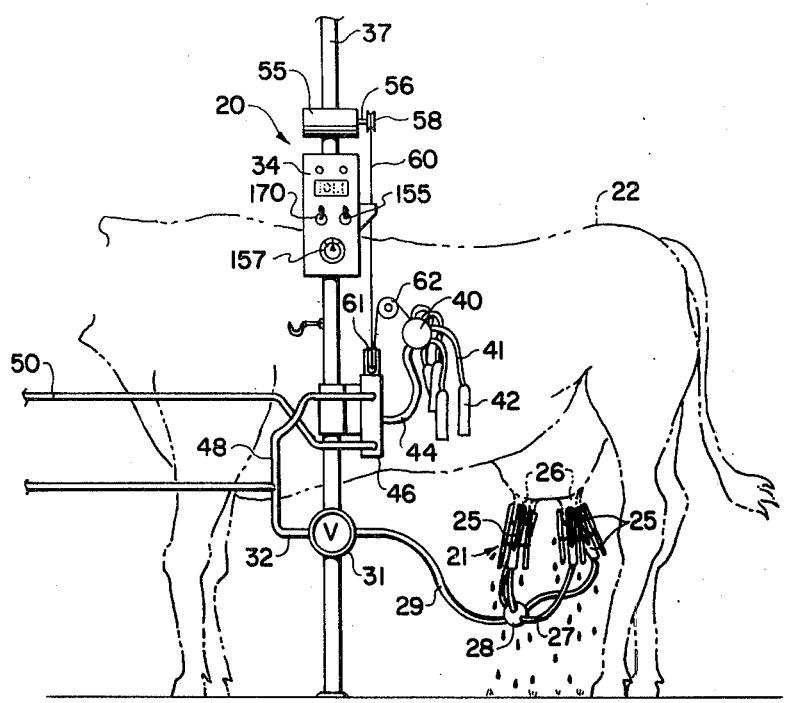
FIG. 1 is a side view of milking and stimulation apparatus with the stimulation unit shown in operative position on an animal.
Figure 2:
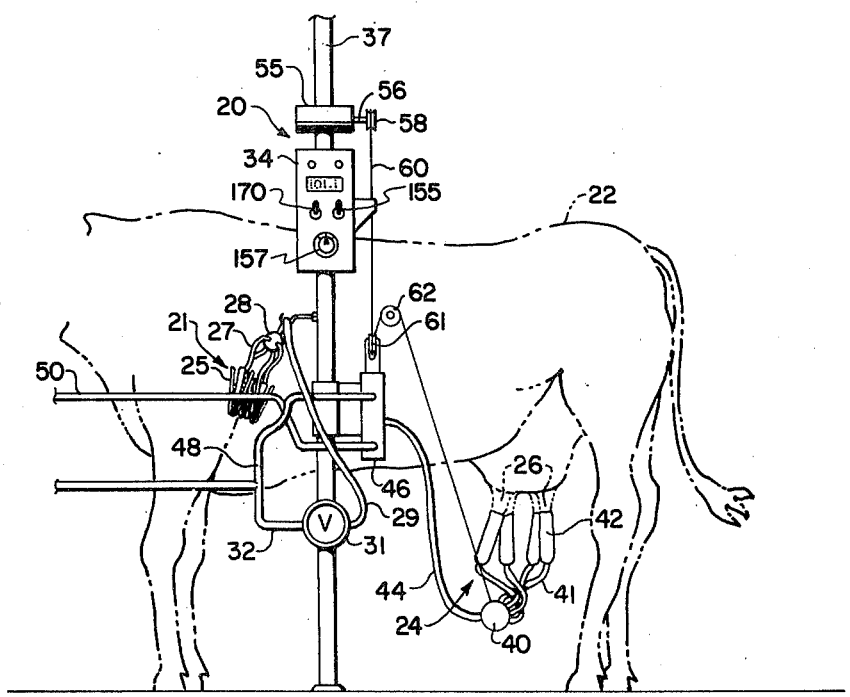
FIG. 2 is a side view of milking and stimulation apparatus as shown in FIG. 1 but with the milking unit shown in operative position on an animal.

Referring now to the drawings, FIG. 1 shows the system 20 with the stimulator unit 21 in operative position to stimulate an animal (such as a cow) 22, while FIG. 2 shows the system 20 with the milker unit, or apparatus, 24 in operative position to milk animal 22.

As shown in FIGS. 1 and 2, stimulator unit 21 includes one or more stimulator gripping devices 25 that releasably grip the teat or teats 26 of the animal to be stimulated. Each gripper device 25 has water supplied thereto through line 27 communicating at junction 28 with one end of line 29, the other end of which line is connected to water valve 30 of water valve unit 31, as shown in FIGS. 1 through 3. It has been found that one gripper device can be effectively utilized on one teat of a cow to induce milk let down, but if desired, a plurality of stimulating gripper devices may be utilized, such as one for each of the four teats of a cow, as shown.

Water valve 30 of unit 31 is, in turn, connected to a conventional pressurized water supply by line 32. Water valve 30 is controlled by electrical actuator 33 which, in turn, is controlled by control unit 34 with electrical lead 35 extending between actuator 33 and control unit 34.

Water valve 31 can be mounted in conventional fashion close to the animal to be stimulated so long as a sufficient amount of line 29 exists to allow the gripper device to be placed on the teats of a cow, as shown in FIG. 1. As shown, water valve unit 31 may be mounted on fixed vertical support 37 close to control unit 34 (which control unit also may be mounted on the support).

Milker apparatus 34 (as shown in operative position in FIG. 2) conventionally includes a milk bowl 40 having a plurality of lines 41 extending therefrom to teat cups 42. Four teat cups 42 are shown for positioning on the four teats 26 of a cow for milking of the cow. A line 44 extends from the milk bowl 40 to one side of milk valve 45 of milk valve unit 46. Three embodiments of the milk valve are shown, and, as indicated in FIGS. 1, 2, and 3, one port of the valve 45 is connected to the water supply through line 48, a second port is connected to the drain at line 49, and a third port is connected to the milk line and vacuum (as is conventional for milking) through line 50. In the preferred embodiment of valve, as shown in FIGS. 6 through 8, the drain and water supply, or rinse, ports are combined, and hence only two ports are utilized.

Valve unit 46 may also be mounted on support 37, if desired, again it only being necessary to provide a sufficient amount of line 44 to allow the milking apparatus to be placed in operative position for milking (as shown in FIG. 2) and for retraction (as shown in FIG. 1). Valve unit 46 includes a milk valve actuator device 48 for both the rotary valve (shown in FIGS. 11 through 13) and for the sliding valve (shown in FIGS. 9 and 10). For the sliding valve, the actuator device may include a pair of actuators as brought out hereinafter. Valve actuator device 48 is controlled by the control unit 34 with electrical lead 49 extending therebetween.

With respect to the valve shown in FIGS. 6 through 8, actuation to commence and terminate milking is mechanically accomplished as brought out hereinafter so that actuator device 48 is not needed where the preferred embodiment of the valve, as shown in FIGS. 6 through 8, is utilized.

Control unit 34 has, as shown in FIG. 3, a conventional power supply 52 connected therewith and has a display section 53 which, as shown in FIGS. 1 and 2, may be the front panel of the control unit. In addition, control unit 34 controls actuation of motor 55 (which motor may be inside control unit 34 with only the motor shaft 56 extending therefrom). Motor 55 controls retraction of milker apparatus 24, as is indicated in FIG. 3 and as is shown in more detail in FIGS. 1 and 2.

Motor shaft 56 has a pulley 58 fastened thereto and has one end of rope 60 wound about and connected thereto. With the preferred embodiment of valve 45, rope 60 extends through pulley 61 of valve 45, through pulley 62 attached to a fixed support, and has the free end fastened to milk bowl 40 of the milker apparatus (as is shown in FIGS. 1 and 2).

If the other shown embodiments of the valve are utilized, then rope 60 extends only through whatever pulleys such as pulley 61 that might be needed to retract the milking apparatus into the retracted position as shown in FIG. 1.

Control unit 34 is also electrically connected through lead 65 to a temperature sensing device 66, such as a thermistor. The temperature sensing device is positioned in the milk flow path to sense the temperature and produce an electrical output signal indicative of flow and/or milk temperature for display. As indicated in FIGS. 1 and 2, the temperature sensor is preferably in the valve itself, but could be positioned elsewhere in the milk flow path.

A temperature sensing device positioned in the milk flow path for indicating milk flow and/or abnormalities with the output signal being suitable for display and/or control of milking apparatus is shown in U.S. Pat. No. 3,874,337, issued Apr. 1, 1975 to Raymond E. Umbaugh and Jerry H. Polson and entitled "Temperature Responsive System for Milking Apparatus".

The stimulator unit, and more particularly the stimulator gripping device 25, is shown in detail in FIGS. 4 and 5. As shown, a plurality (preferably four although any plural number may be utilized) of fingers 70 are pivotally mounted on, and spaced about, a mounting block, or manifold, 71. For pivoting, the inner side 72 of each finger has an inwardly extending flange 73 with an inwardly extending pivot ball 74 thereon, which ball is received in a socket 75 in the mounting block with the flange being recessed from the mounting block to allow the finger to pivot. Manifold 71 has a bore 76 therein connecting with cross passages 77 leading to the socket 75. A coupling 78 at the end of bore 76 has tube 27 attached thereto to supply warm liquid (such as warm water) to the manifold.

Each pivot ball 74 has a passage 80 leading therefrom through the flange to a longitudinal passage 81 formed on the rear side of the finger by channel 82 so that passage 81 extends to the gripping end 83 of the finger. Near end 83 of the finger, a passage 84 opens through the inner side of the finger to allow the warm liquid to be ejected from the finger. As shown in FIG. 5, when the gripping device 25 is in engagement with the teats 26 of an animal to be stimulated, the warm liquid will be ejected from the finger onto the teat.

A plurality of resilient teeth 86 (such as rubber teeth) extend outwardly and downwardly from a resilient pad 87 on the inner face of each finger at the gripping end 83 to control and releasably hold a teat in position between the fingers, as shown in FIG. 5. Passage 84 is preferably adjacent to teeth 86.

At the outer side of each finger, spaced spring retaining ears 89 are utilized to position a spring 90 (or other resilient holding means) in position to hold the fingers against the manifold with the pivot ball on each finger held in a corresponding socket in the manifold. As shown in FIGS. 4 and 5, the spring is positioned forwardly of the ball and socket, and this results, along with the spring, in biasing the fingers so that the gripping ends are biased toward engagement with one another, as shown in FIG. 4.

To overcome the bias and to space the gripping ends of the fingers, the ends 92 of the fingers are urged toward one another to pivot the fingers. As shown in FIG. 5, the thus imposed bias helps to retain the gripping devive releasably attached to the teats of the animal to be stimulated. If desired, ends 92 of the fingers may have dimples 94 thereon (or otherwise be roughened).

The preferred embodiment of the milk valve 45 is shown in FIGS. 1, 2 and 6 through 8. As shown in FIGS. 6 and 7, pulley 61 (which may be delrin) is mounted on the bifurcated end of an actuator rod 98 (which may also be of delrin) with the rod being received in sleeve 100. Rod 98 has a transverse opening 101 therein and into which a metal coupling 102 is inserted with the coupling extended from one side of the rod through a longitudinal slot 103 in sleeve 100. The length of slot 103 determines, of course, the longitudinal movement of the actuator rod with respect to the sleeve.

At the side of sleeve 100 opposite to slot 103, a combined rinse and drain conduit 105 extends from the sleeve with conduit 105 being positioned to communicate with coupling 102 when rod 98 is extended from sleeve 100 to the maximum extendable position permitted by slot 103. Below and spaced from conduit 105 is a milk and vacuum line conduit 106 positioned to communicate with coupling 102 and rod 98 when the rod is retracted into sleeve 100 to the maximum extent permitted by slot 103.

Sleeve 102 connects to tube 44 leading to milk bowl 40 (as shown in FIGS. 1 and 2), while conduit 105 serves as a combination rinse (and/or sanitizing) and drain for the milking apparatus. Warm liquid is inserted into conduit 105 through conduit 108 the inner end 109 of which terminates within conduit 105 and, as shown in FIG. 8, the inner end 109 is closed and has a small opening 110 opening toward the interior of the conduit (i.e., towards the sleeve 100). As also is shown in FIG. 8, the internal diameter of conduit 105 is diminished near conduit 108 by an annular wedge-shaped flange 112. This permits warm liquid to be injected into the system to rinse and/or sanitize the milking apparatus and then the liquid is drained through conduit 105 past the inner end 109 of liquid supplying conduit 108.

Conduit 106 of milk valve 45 is connected with the milk and vacuum lines 50 (as shown in FIGS. 1 and 2) so that, when in milking position, milk from the animal posses through the valve and milk line 50. The temperature sensor 66, such as a thermistor, is inserted into the milk path within conduit 106 through conduit 114 and may be held therein in a conventional manner.

As can be seen in FIGS. 6 and 7, when the rope 60 is pulled (either by operation of motor 55 to retract the milking apparatus or manually), the valve, or actuator rod 98 is pulled from the sleeve 100 and sleeve 102 is brought into communication with the rinse and drain conduit 105. Rod 98 can remain extended out of sleeve 100 until physically or mechanically pushed back into the sleeve 100 to start the milking operation. When rod 98 is retracted into sleeve 100, the milk line and vacuum are connected with the line to the milk bowl and teat cups to establish the milking position of the valve.

Milking will continue until rod 98 is moved from the milking position, which normally occurs atuomatically by the control unit sensing the end of milking and retracting the milking apparatus by winding rope 60 onto pulley 58. This pulls rod 98 out of sleeve 100 so that conduit 102 no longer communicates with conduit 106 and places the valve in the rinse (or sanitize) and drain position (where conduit 102 communicates with conduit 105).

An alternate embodiment (sliding valve 120) of the milk valve is shown in FIGS. 9 and 10. As shown, plate 122 has a conduit 124 mounted thereon which conduit can be brought into communication with any one of three conduits 126, 127 and 128 on fixed plate 130. Conduit 124 connects with line 44 leading to milk bowl 40, while conduit 126 is connected with the warm liquid supply through line 48, conduit 127 is a drain, and conduit 128 is connected with milk and vacuum line 50.

Side engaging plates 132 are utilized to constrain plate 122 to longitudinal sliding movement with respect to fixed plate 130 and actuating device 48 consists of a pair of actuators 134 (though one actuator could be utilized if the single actuator has the ability to move the plate in three distinct positions). If the plates are relatively positioned as shown in FIG. 10 (the milking position), conduit 124 communicates with conduit 128 for the milking operation. When completed, an actuator 134 causes the plate 122 to be moved with respect to plate 130 so that conduit 124 passes the drain conduit 127 and is brought into communication with the liquid supply conduit 126. This rinses and/or sanitizes the milking apparatus, after which the second actuator 134 moves the plate 122 so that conduit 124 connects with the drain outlet 127 on plate 130. After draining, the apparatus is ready for re-use in milking by moving plate 122 so that the conduit 124 is again in communication with conduit 128 of plate 130.

Figures 11, 12, 13:
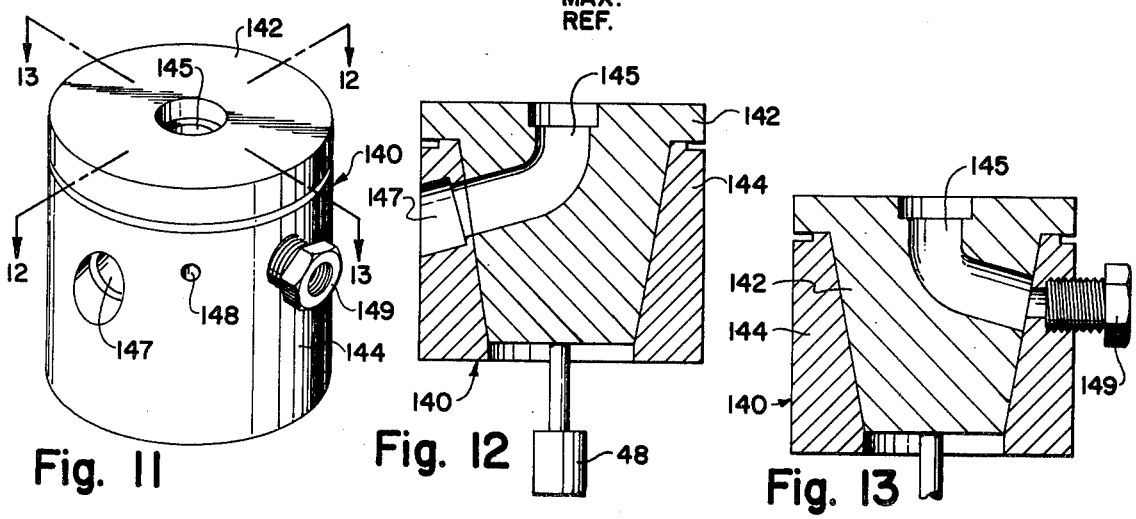
FIG. 11 is a perspective view of a rotary valve that is a second alternate embodiment of milking valve.
FIGS. 12 and 13 are section views taken along the lines 12—12 and 13—13, respectively, of FIG. 11.

A second alternate valve embodiment (rotating valve 140) is shown in FIGS. 11 through 13. The rotary valve is similar in operation to sliding valve 120. A core, or plug, 142 is received in body 144 so as to be rotatable by actuator 48. A passage 145 in core 142 extends from the top downwardly and outwardly to communicate with three conduits, or ports, 147, 148 and 149 in the body 144 of the valve. Passage 145 is connected at the top end with line 44 to the milk bowl, port 147 connects with the milk and vacuum line 50, port 148 is a drain, and port 149 connects with the liquid supply.

Thus core 142 is rotated to the milking position (passage 145 in communication with port 147) for the milking operation, is then rotated to the rinse position (passage 145 in communication with port 149), after which the core 142 is rotated to the drain position (passage 145 in communication with port 148). For re-use, the core is, of course, returned to the milking position.

Figure 14:
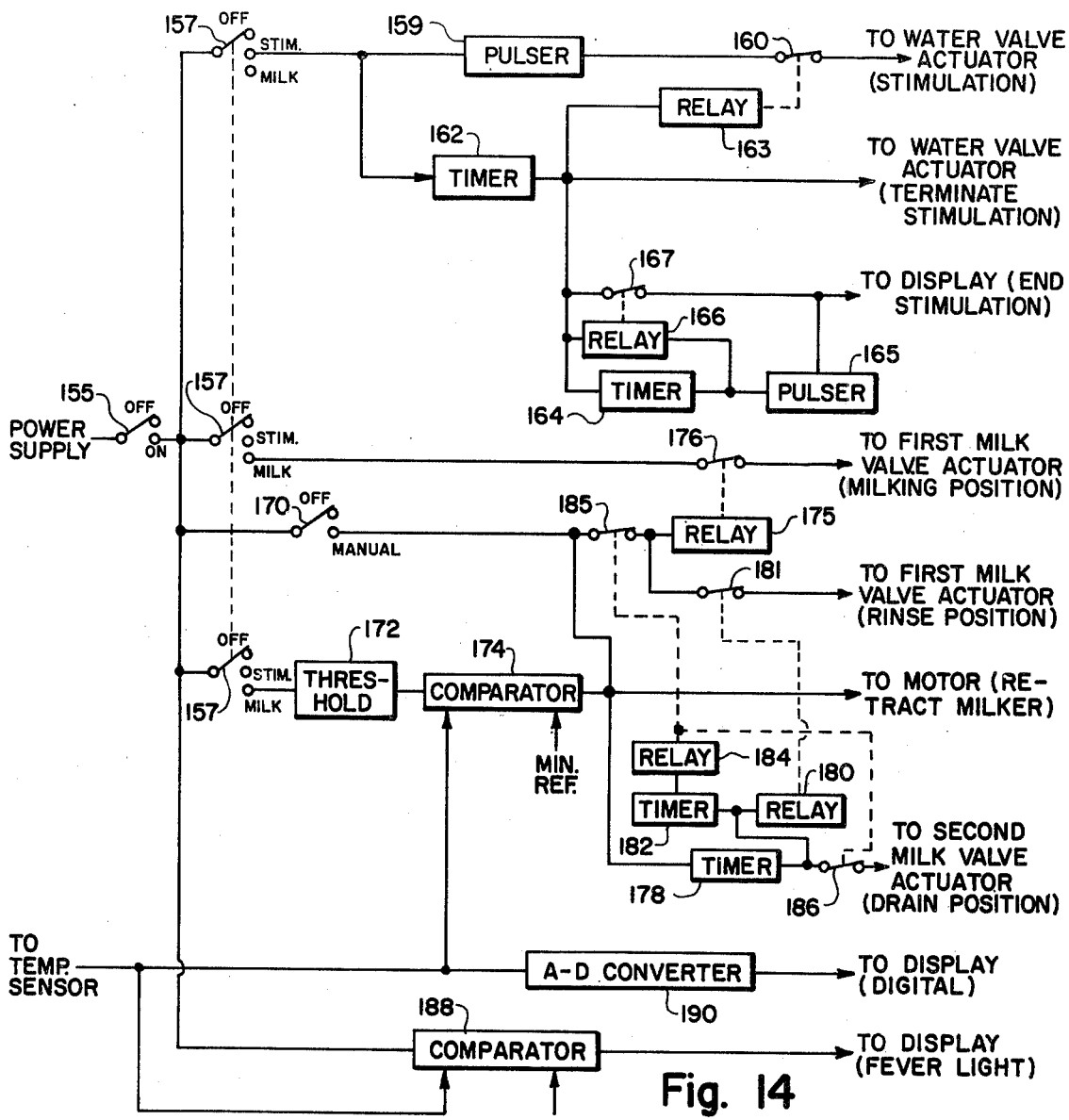
FIG. 14 is an electrical functional diagram of the control unit particularly utilized with the valve shown in FIGS. 11 through 13.
Figure 15:
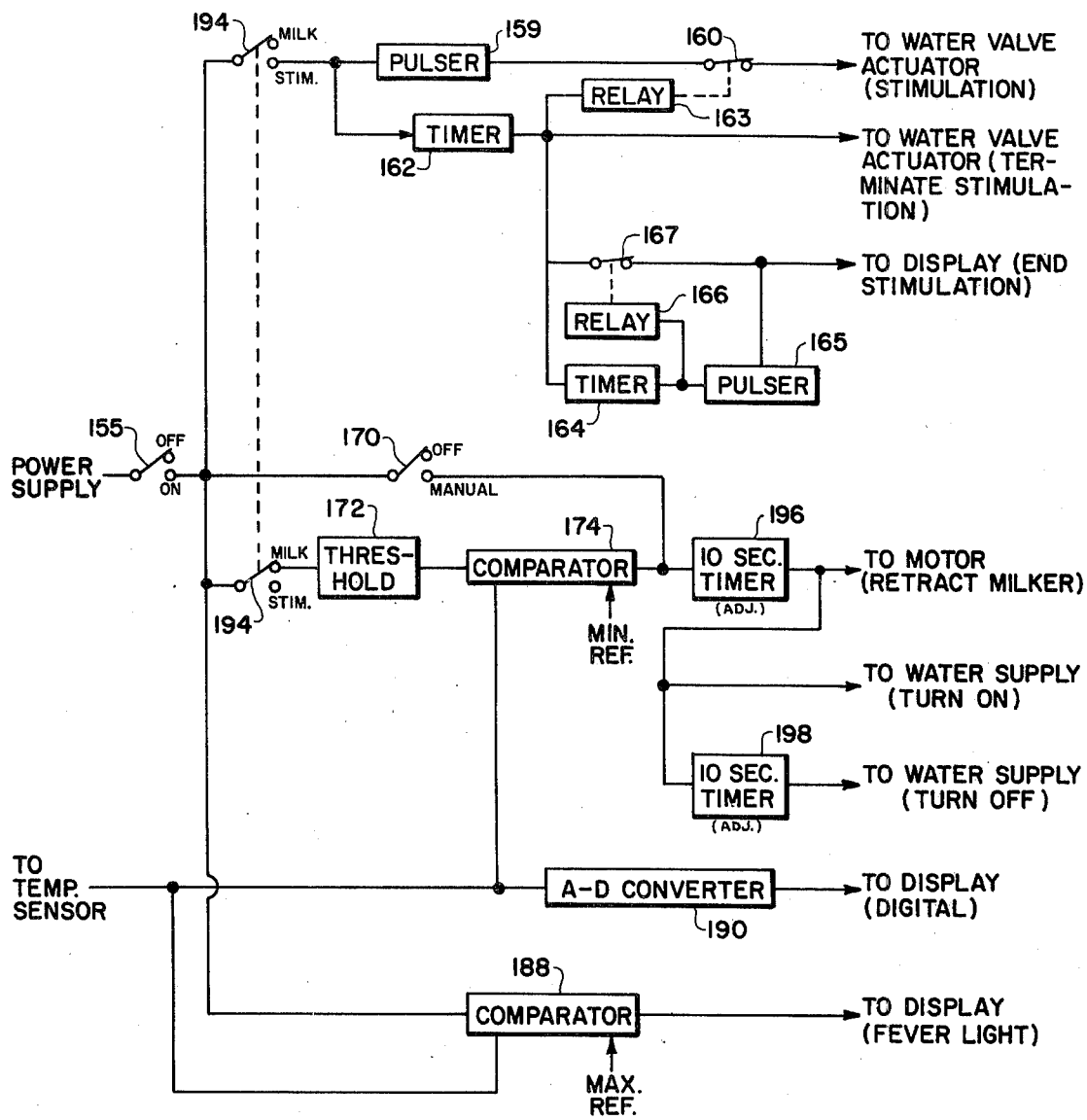
FIG. 15 is an electrical functional diagram of the control unit particularly utilized with the valve shown in FIGS. 6 and 7.

FIG. 14 illustrates operation of the control unit when the sliding valve 120 is utilized (rotary valve 140 could be utilized, however), with FIG. 15 illustrating operation of the control unit when the preferred valve 45 is utilized.

As shown in FIG. 14, the power supply is connected to the control unit through an off-on switch 155. A three-way switch 157 (off-stimulation-milking) is also shown, although it is realized that other equivalent switching could be utilized.

For stimulation of the animal prior to the milking operation, switch 157 is moved to the stimulation position. This energizes the water valve actuator through pulsator 159 and normally closed relay operated switch 160 to supply water to gripping devices 25. The supplied liquid is preferably pulsed, but could be steady if desired. After a predetermined time delay determined by timer 162, relay 163 is energized to open switch 160 and this terminates the supply of water (or other liquid) to the gripper device 25. As shown, the output from timer 162 can be supplied directly to the water actuator to terminate stimulation.

An animal to be milked is stimulated to induce milk let down. By spraying the teats (or udder) with warm liquid such as water, it has been found that this can be made to closely approximate the nursing of a calf and effectively induce milk let down. In this regard, it has been found that the muscular rhythm of a calf's tongue during milking is approximately two and one half times per second. Thus, if a pulser is utilized (such as a solenoid, for example) it preferably causes pulsing of a warm liquid delivered to the gripper device at about this same rate.

Stimulation is preferably carried out for about forty-five seconds, as determined by timer 162, after which stimulation is automatically terminated. When stimulation is terminated, a display light is energized to indicate the end of stimulation. Should milking not be commenced within a predetermined time period as determined by timer 164 (usually about thirty seconds), the end of stimulation light is pulsed, or blinked, by pulser 165 with relay 166 opening normally closed relay actuated switch 167 to allow the light to blink. If desired, a separate warning light could be utilized rather than blinking of the one light. The reason for such a warning is that milk production can be cut if the animal is not milked within a short time after termination of stimulation.

Switch 157 is then placed in the milk position. This de-energizes the stimulator section and causes the milk valve actuator to be moved to the milking position if not already there (i.e., the milk valve connects the milk and vacuum line to the milk bowl and teat cups). With the teat cups on the animal, milking is then commenced. Milking can be manually terminated by means of switch 170, but normally will be terminated only atuomatically when the end of milking is sensed by the apparatus.

The third section of switch 157 connects through threshold 172 to comparator 174 which receives a predetermined minimum reference and the output from the temperature sensor located in the milk flow path (in the valve). A threshold (or a delay) is needed to assure that milking is not prematurely terminated before reaching full flow.

When the comparator senses the end of milking (i.e., when the output from the temperature sensor falls to that of the reference), the commparator energizes motor 55 to retract the milker apparatus by winding rope 60 onto pulley 58. At the same time, relay 175 is energized to open normally closed relay actuated switch 176 to allow movement of the milk valve from the milk position to the rinse position (where the milk bowl and teat cups are connected with the water or sanitizing solution to rinse and/or sanitize the apparatus).

Timer 178 is energized when the valve is moved to rinse and, after a predetermined period of time, the timer 178 causes enerization of relay 180 to open normally closed relay actuated switch 181 to activate the milk valve to the drain position. At this time, another timer 182 is activated and, when this timer times out, relay 184 is energized to open normally closed relay actuated switches 185 and 186 to move the milker valve back to the milking position for re-use.

A comparator 188 is also utilized to receive the output from the temperature sensor and a predetermined maximum reference so that if the temperature exceeds a predetermined value, a fever light or other indication of abnormality is displayed to indicate the same. In addition, the output from the temperature sensing device can be coupled through an analog to digital converter 190 and the sensed temperature then displayed as a digital readout.

Thus, in operation, the operator attaches the gripper device to an animal, switches to stimulation and waits for an indication of the end of stimulation. After stimulation is terminated, the gripper devices are then removed from the animal and the teat cups attached to the teats with the switch being actuated to milk. Milking then commences and after termination of milking is sensed, the apparatus will automatically terminate the milking operation and rinse and/or sanitize and drain the apparatus, as well as automatically retract the same from the animal.

When using the preferred valve as shown in FIGS. 6 through 8, operation is shown by the electrical functional diagram of FIG. 15. Stimulation is carried out in the same manner as above described in connection with FIG. 14 except that a two-position switch 194 can be utilized instead of the three-position switch 157. The start of milking, however, occurs when the atuator rod 98 (of the milk valve) is moved by the operator or mechanically into sleeve 100 after which the teat cups are placed on the teats of the animal to be milked. Milking then continues, unless manually terminated by switch 170, until the sensed temperature to comparator 174 causes an output therefrom to energize a timer 196 (such as for 6 to 10 seconds, for example) which energizes motor 55 to retract the milking apparatus by winding rope 60 onto pulley 58 to retract the milking apparatus from the milked animal. The movement of the rope pulls actuator 98 from sleeve 100 (of the milk valve) and this terminates milking by moving the valve to the rinse and drain position, at which time the water supply is turned on for up to ten seconds and then turned off by timer 198. Rod 98 remains extended from sleeve 100 until the operator then moves the rod back into the sleeve for re-use of the apparatus or this is mechanically accomplished as for weights or springs, for example.

As can be seen from the foregoing, this invention provides an improved valve unit that is particularly useful in milking apparatus.

What is claimed is:

1. In a milking apparatus having a milk bowl line, a milk and vacuum line, and a rinsing liquid line, a multiported valve, comprising:
 a first elongated element having a plurality of longitudinally spaced openings therein at one portion of said first element, one of which openings is adapted to be connected with said milk and vacuum line and another of which openings is adapted to be connected with said rinsing liquid line, said first element having an additional opening therein at another portion thereof;

a second element having at least one opening therein adapted to be connected with said milk bowl line through said additional opening in said another portion of said first element, said second element being contiguous to said first element with said first and second elements being constrained to longitudinal movement in a predetermined path with respect to one another and said second element being adapted in one predetermined positioning of said elements along said path to connect said milk bowl line with said milk and vacuum line through said opening in said second element with said second element then blocking connection of said rinsing liquid line with said milk bowl line and said milk and vacuum line, and in a second predetermined positioning of said elements along said path to connect said milk bowl line with said rinsing liquid line through said opening in said second element with said second element then blocking connection of said milk and vacuum line with said milk bowl line and said rinsing liquid line; and means connected to one of said elements to enable actuation of the same with respect to the other element to cause said relative longitudinal movement therebetween along said predetermined path.

2. The valve of claim 1 wherein said first element has a third opening therein for drainage purposes, and wherein said second element is actuated in a third predetermined positioning of said element to connect said bowl line to said third opening.

3. The valve of claim 1 wherein said means to enable actuation of one of said elements includes an actuator to control movement of said one element.

4. The valve of claim 1 wherein said means to enable actuation of one of said elements includes a pulley mounted on said element.

5. The valve of claim 1 wherein said first element is a body portion having a first conduit connected to said milk and vacuum line and a second conduit spaced from said first conduit and connected to said rinsing liquid line, and wherein said second element is a movable element having a third conduit therein connected with said milk bowl line, said movable element being movable in reciprocal directions with respect to said body portion to bring said third conduit into commuication with one and then the other of said first and second conduits to effect mutually exclusive milking and rinsing of the milking apparatus.

6. The valve of claim 5 wherein said body portion is a hollow cylinder, wherein said movable element is a rod movable in longitudinal directions within said cylinder, and wherein said second conduit on said cylinder provides drainage means whereby said milking apparatus can be rinsed and drained when said third conduit is in communication with said second conduit.

7. The valve of claim 5 wherein said body portion is a substantially flat plate, and wherein said movable element is a substantially flat plate contiguous to said body portion and constrained to movement in predetermined directions to effect said predetermined communication of said conduits.

8. In a milking apparatus, a multi-ported valve, comprising:

a hollow cylindrical body portion having first and second longitudinally spaced openings therein and a slot at the opposite side of said body portion from said openings with the opposite ends of said slot being substantially in horizontal alignment with said openings;

a first conduit communicating with the interior of said body portion through said first opening therein, said first conduit having an opened end for drainage purposes;

a second conduit having one end received in said first conduit near the open end thereof, said one end of said second conduit being closed and having an aperture in the side wall with said aperture being within said first conduit and facing substantially away from the open end thereof, said second conduit being connectable with a source of rinse liquid;

a third conduit communicating with the interior of said body portion through said second opening therein, said third conduit being connectable with a milk and vacuum line;

an actuator rod received within said hollow cylinder, said actuator rod having a transverse opening in the central portion thereof and a bifurcated end portion;

a sleeve extending through said transverse opening in said actuator rod and extending through said rod in said body portion and connectable with a milk bowl line, said sleeve extending through said slot so that said rod is thereby constrained to longitudinal movement in reciprocal directions as determined by the length of said rod so that movement in one direction brings said sleeve into communication with said first conduit and movement in said second direction brings said sleeve into communication with said third conduit; and a pulley mounted between said bifurcated end portions of said actuator rod.

9. The valve of claim 8 wherein said first conduit includes flow restriction means adjacent to said aperture in said second conduit.

10. The valve in claim 8 wherein said third conduit has a temperature sensing means mounted therein to sense the temperature of milk flow therethrough.

11. In a milking apparatus, a multi-ported valve, comprising:

a first element having first, second and third spaced openings therein with said second opening being between said first and third openings;

a first conduit communicating with said first opening in said first element, said first conduit being connectable to a rinse liquid source;

a second conduit communicating with said second opening in said first element, said second conduit providing drainage;

a third conduit connected with said third opening in said first element, said third conduit being connectable with a milk and vacuum line;

a second element contiguous to said first element and having an opening therein;

a fourth conduit connected with said opening in said second element, said fourth conduit being connectable with a milk bowl line; and actuator means for causing movement of said second element so that said opening therein is brought into selective communication with said openings in said first element, said movement of said second element causing a change in the communication of said opening therein between said first and third openings of said first element necessarily requiring communication of said opening in said second element with said second opening in said first element during a portion of said movement with said opening in said second element being out of communication with said first and third openings of said first element when in communication with said second opening in said first element.

12. The valve of claim 11 wherein said first and second elements are flat plates with said second plate being constrained to longitudinal movement with respect to said first plate.

13. The valve of claim 11 wherein said first element is a cylinder having a tapered opening in the top portion thereof, and wherein said second element is a plug having a tapered portion and received in said tapered portion in said cylinder so that said plug is rotatable with respect to said cylinder.

* * * * *